United States Patent [19]

Jong

[11] 3,912,206
[45] Oct. 14, 1975

[54] LOAD LIFT AND SKID PAD ASSEMBLY

[75] Inventor: Howard W. Jong, Monterey Park, Calif.

[73] Assignee: McDonnell Douglas Corporation, Santa Monica, Calif.

[22] Filed: Mar. 1, 1974

[21] Appl. No.: 447,295

[52] U.S. Cl. ............................... 248/24; 244/118 R
[51] Int. Cl.² ........................................ F16M 13/00
[58] Field of Search ............ 244/118 P, 118 R, 120; 105/366; 248/24, 25, 361 R; 224/42.32, 42.38, 42.4; 52/79, 34, 35

[56] References Cited
UNITED STATES PATENTS

| 943,709 | 12/1909 | Sherwood | 248/24 |
| 1,810,309 | 6/1931 | Dobson | 248/25 |
| 2,055,715 | 9/1936 | Barker | 248/24 |
| 2,247,340 | 6/1941 | Webster | 52/79 |
| 2,442,459 | 6/1948 | Fowler | 105/366 R |
| 3,118,187 | 1/1964 | Alimonestiano | 52/34 |
| 3,128,071 | 4/1964 | Frazer-Nash | 248/24 |
| 3,349,418 | 10/1967 | Hein | 105/366 R |
| 3,652,050 | 3/1972 | Marrujo et al. | 248/361 R |

FOREIGN PATENTS OR APPLICATIONS

| 70,218 | 7/1969 | Germany | 248/24 |
| 628,634 | 10/1927 | France | 105/366 R |

Primary Examiner—Trygve M. Blix
Assistant Examiner—Galen L. Barefoot
Attorney, Agent, or Firm—Walter J. Jason; Donald L. Royer

[57] ABSTRACT

A load lift and skid pad assembly for supporting and for use in moving replaceable modular units such as in the conversion of aircraft between freight and passenger use. Provision is made to anchor the assemblies (and thus the modular unit) to the floor for installation and to raise the modular unit for movement on the skid pads when unfastened.

6 Claims, 6 Drawing Figures

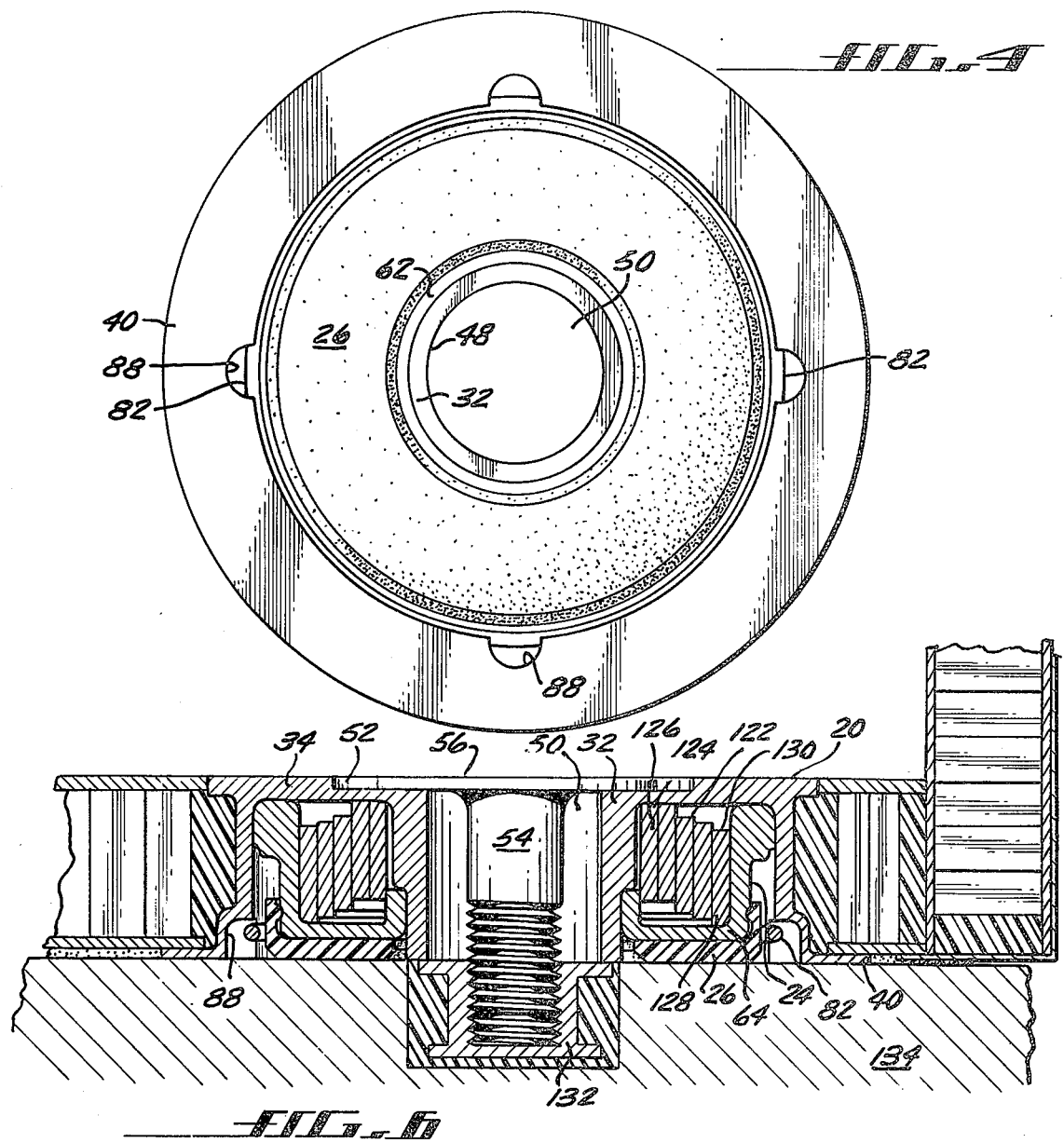
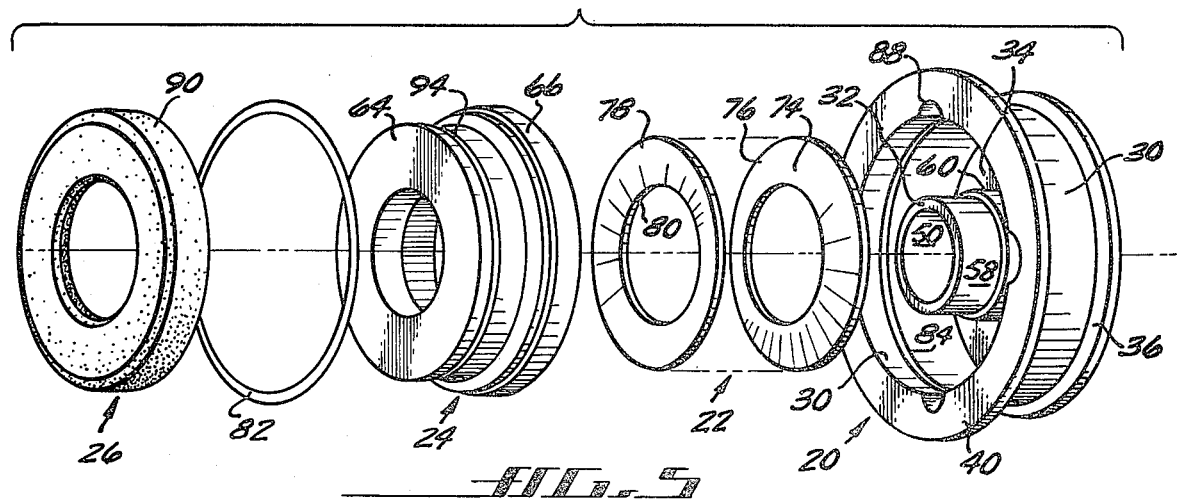

LOAD LIFT AND SKID PAD ASSEMBLY

BACKGROUND OF THE PRESENT INVENTION

Airlines have routes over which they fly passengers, and other routes over which they haul freight. Still other routes are mixed, in that both passengers and freight are flown from place to place. In the interest of economy and efficiency in meeting these consumer requirements with available aircraft, airlines frequently must convert the aircrafts' interiors from freight to passenger or from passenger to freight configurations. These conversions must be made quickly and with a minimum of effort. Certain areas of passenger convenience such as food preparation areas, coat storage areas and restrooms have been built in modular unit form for this purpose so that the conversion time may be reduced to a minimum. These units are very compact and yet almost fully occupy all available space for their use so that there is very little clearance about the units to facilitate their installation and removal. For example, because of a drop ceiling overhead, the lavatory unit may not be raised more than three-eighths inch off the floor during its installation and removal.

In addition, the unit must be sealed to the floor to prevent spilled water from leaking under the modular unit, causing possible aircraft structure corrosion or short circuitry of electrical devices carried by the unit. The previous method of sealing has been to caulk between the floor and the base bottom. Stripping is then required when the unit is removed.

The decorative covering of the units presents another problem. The units' outer walls are covered with plastic film sheets in a manner similar to covering inside walls in a house with wallpaper. On these units the wall covering sheets are folded under and fastened to the bottom surface of the base. Scuffing occurs along the bottom wall edge as the units are pushed into and out of position. This requires frequent repair of the unit wall surfaces which is time consuming and often presents material matching problems due to color fading and unavailability of discontinued patterns.

SUMMARY OF THE PRESENT INVENTION

In accordance with the present invention modular units are provided with seal strips attached about the periphery of the unit floor or base undersurface. These strips preferably are of a closed cell plastic foam that compresses against the aircraft floor when the unit is installed. These strips provide an effective seal without additional caulking and the units can be raised and moved without damage to the seal strips.

Several load lift and skid pad assemblies are mounted in the base of each modular unit to facilitate its installation and removal. Each of these assemblies has a mounting affixed to the module base and has an opening in its center through which an end of a fastener may be passed. These assemblies are spaced on the unit base so that their center openings will be in substantial alignment over pre-positioned tie-down openings in the aircraft floor on which the units are to be installed. The openings are somewhat larger than the shanks of the fasteners so that some lateral shifting of the fastener is permitted in aligning the fastener with the tie-down opening. This center opening in the mounting is defined by an annular wall over which a plurality of stacked Belleville springs is positioned with the uppermost spring in the stack bearing against an undersurface of the portion of the mounting around the opening. A pad support bears against the lowermost spring and is held in assembled position by a ring in an annular groove in the mounting. The springs extend between the pad support and mounting to raise the modular unit on the order of three-eighths inch when the fastener is removed and the unit is moved into or out of position.

The load lift height of these assemblies is the height they raise the units when they are unfastened from the floor. Although in a specific use this height is limited to on the order of three-eighths inch, this height may be varied for other applications as desired by changing the number of Belleville springs in the stack, or using other springs with different compression characteristics. The mounting and pad support structure need not be modified for this purpose.

The pad support has a low friction floor contacting pad on its lower surface that facilitates skidding of the module into and out of its designated position in the aircraft. This pad support is telescopically depressible against the compression force of the springs when the modular unit is fastened down to the floor. These pad supports provide a relatively large floor contact area and thus a low load factor for the units. The aircraft floor is not damaged with grooves or other depressions that may result if rollers or wheels were used in moving the units.

BRIEF DESCRIPTION OF THE DRAWINGS

FIG. 4 is a bottom plan view of the pad assembly taken substantially along line 4—4, FIG. 2;

FIG. 5 is an exploded isometric view showing the various components of the pad assembly and their relationship prior to assembly; and FIG. 6 is a sectional view similar to FIG. 3 and showing a modified form of fastener and load lift structure.

BRIEF DESCRIPTION OF ILLUSTRATIVE EMBODIMENT

Figure 1:
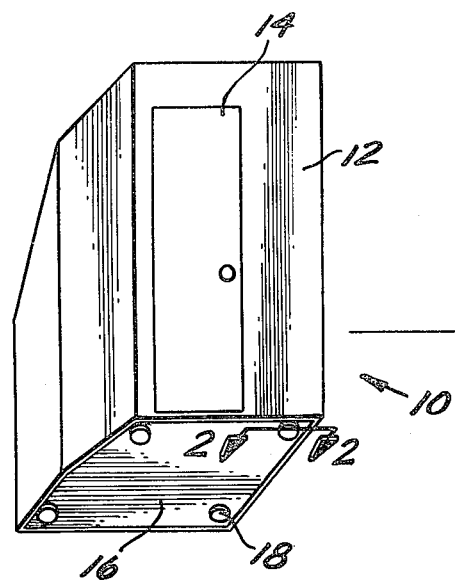
FIG. 1 is an oblique view of a typical removable modular unit with load lift and skid pad assemblies mounted on its base.

Reference is made to FIG. 1 wherein there is shown a typical modular unit 10 having a plurality of vertical walls 12 forming a cubical with an access door 14. This unit has a base or floor 16 in which is installed a plurality of load lift and skid assemblies 18. This modular unit may be any of several types for the convenience of passengers in an aircraft, such as a lavatory, coat and baggage storage area or food preparation area, for examples. Such units are necessary when an aircraft is arranged for passenger use but they unnecessarily occupy needed space when the aircraft is desired for freight transportation. Hence, these units must be removed as quickly as possible and without damage to the units or to the aircraft interior since, at another time, the units must be put back for subsequent passenger use. Typically, these units weigh on the order of 300 pounds and must fit into very confined areas where dollies, jacks or tow devices cannot be used in assisting workmen in their installation or removal of the units. The assemblies 18 cause the units to be raised on the order of three-eighths inch when the tie-down fasteners (shown in FIGS. 3 and 6) are removed. These assemblies have floor contacting pads (shown in FIGS. 2, 3, 4 and 5) with low friction surfaces of sufficient size, on the order of 2 or 3 inches in diameter, that the units may be slid around easily and without damage to the aircraft floor.

Figure 2:
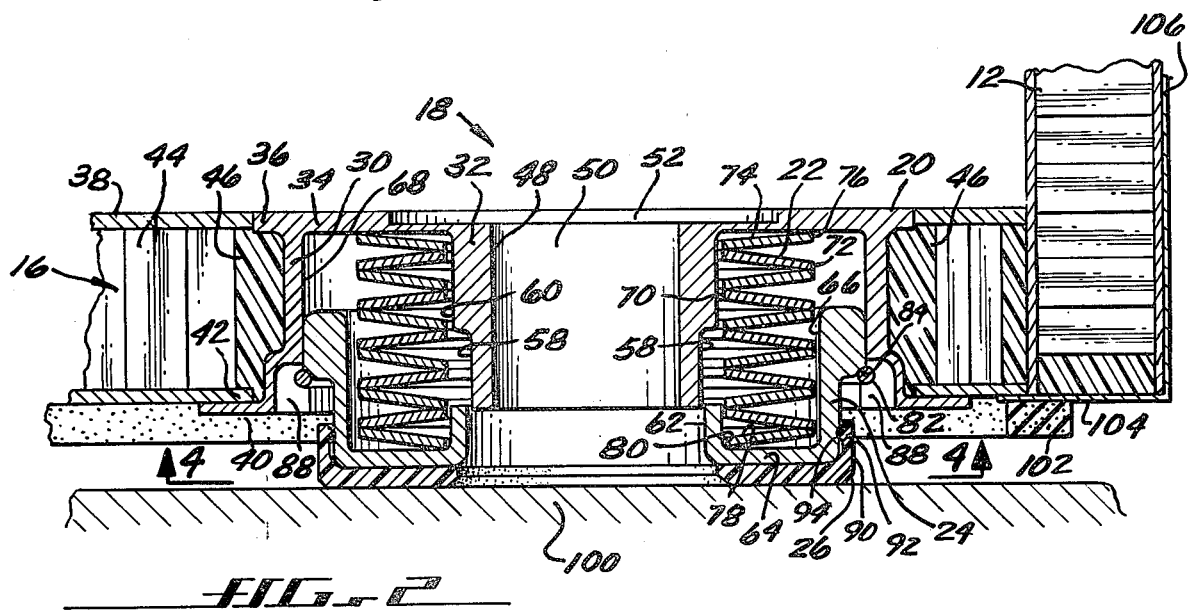
FIG. 2 is an enlarged, fragmentary, sectional view taken substantially along line 2—2, FIG. 1, and showing the assembly prior to fastening and the skid pad extended.

In FIG. 2 there is shown a sectional view of assembly 18 with the floor contacting pad extended to support the modular unit base 16 in raised position for movement in installing or removing the unit. Both base 16 and wall 12 are shown constructed of honeycomb panels having a high strength-to-weight ratio in conformance with usual practice relating to the fabrication of aircraft structures.

Assembly 18 consists of a mounting 20, a plurality of stacked Belleville springs 22, a pad support 24, pad 26, and an assembly ring 28. Mounting 20 has a pair of spaced annular walls, outer rim 30 and an inner fastener guide wall 32, connected by an annular plate 34. Extending integrally outwardly from plate 34 beyond outer rim 30 is an annular upper flange 36. Both plate 34 and flange 36 are level, coextensive and flush with the top surface 38 of modular unit base 16 which abuts against flange 36. At the lower end of outer rim 30 is an annular lower flange 40 extending radially outwardly. The lower surface 42 of base 16 rests on this lower flange. The circular opening in upper surface 38, honeycomb core 44, and lower surface 42 of base 16 is of such size that mounting 20 may be inserted from underneath the base with the annular lower flange 40 of the mounting being larger than the opening to serve as a support collar upon which the base 16 rests. A potting compound 46 such as RTV630, an elastomeric potting compound marketed by General Electric, is placed outside the outer rim 30 and between flanges 36 and 40 to maintain the mounting 20 in the opening of base 16, as shown.

Figure 3:
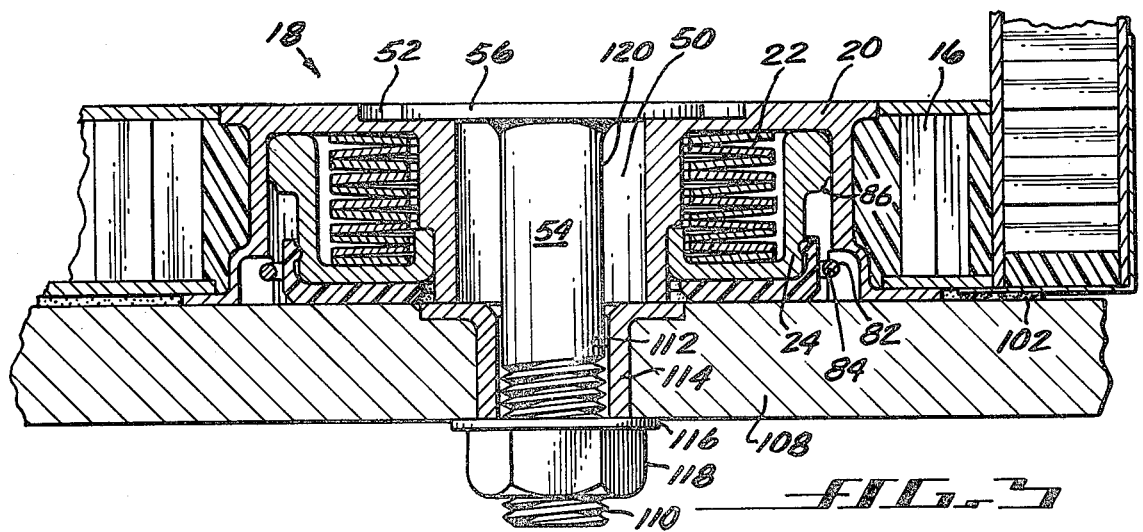
FIG. 3 is a sectional view similar to FIG. 2 showing the assembly in a fastened position with the skid pad and seal compressed due to the installation of the floor fastener.

The inner fastener guide wall 32 has a cylindrical inner wall surface 48 defining a fastener opening 50 through which a fastener 54 may be inserted, as shown in FIG. 3. Annular plate 34 has a recess 52 around the top of opening 50 to receive a flush mounted fastener head 56, as shown in FIG. 3. Both opening 50 and recess 52 are larger than the fastener 54 and its head 56 to permit lateral movement of the fastener 54 for alignment with a fastener hole in the aircraft floor.

The inner fastener guide wall 32 has an outer cylindrical surface 60 with an annular recess 58 at its lower end. This recess receives and provides clearance for upturned annular flange 62 on pad support 24 when the assembly is compressed as shown in FIG. 3.

Pad support 24 consists of an annular substantially flat pad support base 64 having an inner upturned annular flange 62 telescopically engageable in the annular recess 58. Pad support base 64 also has an outer upstanding annular pad support guide 66 telescopically engageable with the inner wall surface 68 of outer rim 30. Thus, pad support base 64 has movement between its extended position shown in FIG. 2 and its retracted position shown in FIG. 3.

Positioned between flange 62 and guide 66 and around the inner fastener guide wall 32 is a plurality of Belleville springs 32. The uppermost spring 74 has its outer edge 76 bearing against the undersurface of top annular plate 34 and the lowermost spring 78 has its inner edge 80 bearing against the upper surface of the pad support base 64. These springs are truncated cones with their inner circular edges 70 in planes spaced from their outer circular edges 72 as shown in their normal position in FIG. 2. When pad support base 64 is retracted to its position shown in FIG. 3 the springs are compressed and the planes of the outer and inner edges move closer together. This places the springs in compression so that when fastener 54 in FIG. 3 is removed, the springs 22 expand and extend pad support base 64 to its position shown in FIG. 2.

The assembly of mounting 20, springs 22 and pad support 24 is held together by ring 82 partially embedded in an annular groove 84 in the inner wall surface 68 of outer rim 30. The exposed portion of the ring abuts a lip 86 on pad support guide 66 when pad support 24 is in extended position as shown in FIG. 2 to prevent its further withdrawal. In this extended position the upturned annular flange 62 becomes an extension of the inner fastener guide wall 32 to keep the Belleville springs 22 in position, as shown. Recesses 88 spaced about the groove 84 in outer rim 30 facilitate installation and removal of the ring 82.

Annular support pad 26 has an upstanding annular flange 90 around its perimeter. The inner surface of this flange 90 has an inwardly directed annular protuberance 92. The outer surface of pad support guide 66 has an annular groove 94 into which protuberance 92 fits to maintain flange 90 over the lower end of pad support guide 66 and support pad 26 against the under surface of pad support base 64.

Both the inner annular edge 96 and outer annular edge 98 of pad 26 are tapered or rounded to permit skidding without snagging. The pad 26 may be constructed from a low friction material, such as a plastic material of which Teflon is an example. In an illustrative test, a 220 pound modular unit had four assemblies with 3-inch diameter pads on its base. It required 32 pounds of force 3 inches above the floor 100 to move it over a concrete slab. At door knob level it required 35 pounds, and at 60 inches a 38 pound force was required.

The seal strip 102 preferably is one-eighth inch thick and five-eighths inch wide urethane foam having a density of about 2½ pounds per cubic foot. It is cemented to the periphery of the base 16 preferably over the turned-under edge 104 of the plastic covering 106 on wall 12.

Reference is now made to the sectional view in FIG. 3 which shows the assembly 18 bolted to the aircraft floor 108 as a means for installing the modular unit in an aircraft. Here is shown bolt 54 inserted through fastener opening 50 with bolt head 56 in recess 52. The threaded end 110 extends through fastener opening 112 in floor 108. This opening is provided with a sleeve 114 securely fastened in the floor 108. An appropriate washer 116 bears against the sleeve 114 from the underside of floor 108 and nut 118 is tightened on bolt 54 to depress it, and thus assembly 18, downwardly against the floor 108. Springs 22 have been compressed to permit depression of the assembly mounting 20 over the pad support 24 although upon removal of the bolt 54, the springs 22 will expand the assembly 18 again and the unit will "pop-up" to the position shown in FIG. 2, ready for removal. Seal 100 is shown in FIG. 3 compressed between the bottom of base 16 and the top of floor 108. It is to be noted that the head 56 and shank 120 of bolt 54 is smaller than recess 52 and opening 50 so that end 110 may pass through opening 112 even if the fastener opening 50 is not fully aligned over it.

FIG. 4 is a bottom plan view taken along line 4—4 showing the underside of the assembly and FIG. 5 is an exploded view in isometric showing the relationship of the various parts prior to their assembly. In assembling the parts, the springs 22 are first inserted through the bottom of mounting 20 and over the outer cylindrical surface 60 of fastener guide wall 32. Thereafter pad support 24 is pressed against the outermost spring 78. Ring 82 is next placed over the pad support 24 and pushed inwardly against springs 22 (only slightly to the position shown in FIG. 1) until the ring snaps into the annular groove 84 in mounting 20. Pad 26 is then placed over pad support base 64 and the annular protuberance inside flange 90 snaps into annular groove 94 on pad support 24. It is also possible to install the pad support 24 with the pad 26 already mounted on it, if desired.

Recesses 88 in outer rim 30 of mounting 20 are spaced about to facilitate disassembly. They permit a tool to be inserted to remove ring 82 from groove 84 and thus permit disassembly of the pad support 24 and the springs 22.

An alternate form of spring is shown in the sectional view in FIG. 6. This is an involute spring 122 having the upper edge 124 of the inner spiral 126 bearing against the undersurface of top annular plate 34 and the lower edge 128 of outer spiral 130 bearing against the top surface of pad support base 64. The spring is shown compressed because of bolt 54 being fastened in a threaded receptacle 132. This receptacle is embedded in a floor 134 where a retaining nut fastened from the underneath side of the floor would be impractical. Obviously, many types of springs can be used to cause the modular unit to "pop-up" when the floor fastener is removed. Also, many types of floor fasteners can be used with this assembly. The telescopic assembly itself may be varied or modified without departing from the spirit of the present invention.

I claim:

1. A load lift and skid pad assembly for supporting and for use in moving a replaceable modular unit having a base, said assembly comprising:

a mounting for attachment to the base of said unit,
a pad support telescopically insertable in said mounting, said pad support having an extended position and a retracted position, and
resilient means urging said pad support to said extended position,
said mounting having an opening therethrough for insertion of a fastener to cause said pad support to be in its retracted position,
said mounting having a top annular plate, an inner fastener guide wall extending downwardly therefrom, and an outer rim extending downwardly from said plate,
said resilient means being a plurality of stacked Belleville springs around said guide wall and within said outer rim,
said springs bearing against said top annular plate and against said pad support to urge said pad support to its extended position,
said inner fastener guide wall defining said opening in said mounting through which the shank of a fastener may be passed in moving said pad support to its retracted position.

2. A load lift and skid pad assembly as in claim 1 in combination with a modular unit having a base with said assembly mounted thereon, said base being raised above a supporting floor when said pad support is in its extended position and substantially on said supporting floor when said pad support is in its retracted position, said base having a resilient seal strip attached to the bottom surface thereof, said strip being compressed against said supporting floor when said pad support is in its retracted position.

3. A load lift and skid pad assembly in combination with a modular unit as set forth in claim 2 wherein said mounting is positioned in an opening in said base and wherein said mounting has a lower annular collar bearing against said base around said opening to thereby raise said base above said supporting floor when said pad support is in its extended position.

4. A load lift and skid pad assembly in combination with a modular unit as set forth in claim 2, in further combination with a supporting floor, a fastener, and a fastener receptacle in said supporting floor, said opening in said mounting having an end of said fastener inserted therethrough and into said fastener receptacle to maintain said pad support in its retracted position.

5. A load lift and skid pad assembly as set forth in claim 1 wherein said pad support has a low friction surface for engagement with a supporting floor, said low friction surface being on a plastic pad secured to said pad support.

6. A load lift and skid pad assembly as in claim 1 wherein said outer rim has an annular groove therein, and a locking ring partially embedded in said groove and a locking ring partially embedded in said groove and partially in the path of telescopic movement of said pad support to prevent disengagement of said pad support and springs from said mounting.

* * * * *